Dec. 21, 1965

A. G. STIMSON 3,224,350

BATTERY TEST CIRCUIT CAMERAS

Filed Feb. 18, 1964

ALLEN G. STIMSON
INVENTOR.

BY R. Frank Smith
Robert W Hampton
ATTORNEYS

United States Patent Office 3,224,350
Patented Dec. 21, 1965

3,224,350
BATTERY TEST CIRCUIT CAMERAS
Allen G. Stimson, Rochester, N.Y., assignor to Eastman Kodak Company, Rochester, N.Y., a corporation of New Jersey
Filed Feb. 18, 1964, Ser. No. 345,775
4 Claims. (Cl. 95—10)

The present invention relates to battery powered cameras having photoelectric exposure control systems and more particularly concerns battery test circuits for such cameras.

Many amateur motion picture cameras have battery powered electric motors for operating their shutter and pull-down mechanisms and have photoelectric exposure control systems for adjusting the shutter and/or the lens diaphragm automatically with changes in scene brightness to regulate exposure of film in the camera. Such cameras function properly only when the motor battery delivers at least a predetermined threshhold of supply voltage under load conditions. Accordingly, battery test circuits are commonly provided in such cameras, using elements of the exposure control system, to apprise the camera operator of the condition of the motor battery. However, a typical battery test circuit of the prior art produces a continuously variable deflection of an instrument pointer, requiring the camera operator to ascertain whether the pointer is above or below some critical scale position and to make a judgment on the necessity of replacing the battery when the reading is close to the critical value.

An object of the present invention is to simply the scale reading of a battery test indicator by providing only full deflection or zero deflection of an instrument pointer to indicate whether or not the battery output voltage is adequate. Other objects of the invention will appear from the following description, reference being made to the accompanying drawings, wherein.

Figure 1:
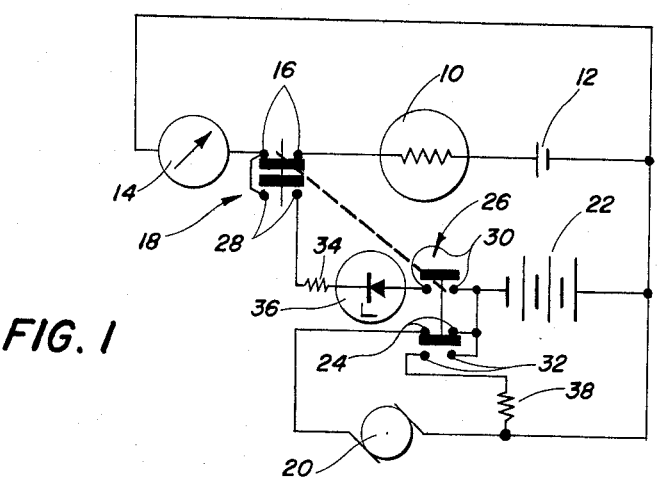
FIG. 1 is a schematic wiring diagram of a circuit embodying the present invention.

Referring to FIG. 1 of the drawings, the photoelectric exposure control circuit comprises a photocell 10, illustrated as a photoconductive cell, a battery 12 used when cell 10 is of the photoconductive type, and an electric measuring instrument 14. This circuit is completed through a first pair of contacts 16 of a double pole, double throw switch 18. Cell 10, which is illuminatable by scene light, has a resistive impedance dependent upon its illumination and therefore controls energizing of instrument 14 as a function of scene brightness. In a manner well known in the art, instrument 14 regulates exposure of film in the camera.

The motor circuit comprises a motor 20 and a battery 22. This circuit is completed through a first pair of contacts 24 of a double throw, triple pole switch 26, which is interlocked with switch 16 so that normally closed contacts 24 are opened when contacts 16 are opened for checking battery voltage. Battery 22 is preferably separate from battery 12 so that variations in the former under differing motor load conditions do not affect operation of the exposure control circuit.

For simplicity of illustration, the test circuit is shown as applied only to battery 22, although it or a similar circuit may be used for battery 12 as well. The test circuit is completed when switches 18 and 26 are reversed from the positions shown in FIG. 1, thereby opening contacts 16, closing a pair of contacts 28 in switch 18, opening contacts 24 and closing two pairs of contacts 30 and 32 in switch 26. This completes a circuit including battery 22, instrument 14, contacts 28, a current limiting resistor 34, a Zener diode 36 and contacts 30. If the design preference is to avoid operating the motor during the battery test, the motor load can be simulated by a resistor 38, which is connected by contacts 32 to battery 22 in parallel with the test circuit.

Figure 2:
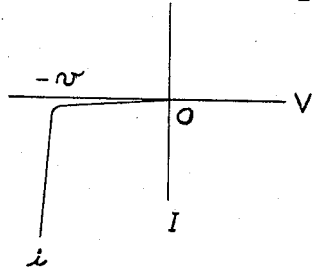
FIG. 2 is a characteristic operating curve for the Zener type diode used in the circuit of FIG. 1.

Referring to FIG. 2, illustrating a voltage-current curve for a typical Zener diode, it will be seen that, as is well known in the art, this type of diode displays very high resistance until there is a significant amount of voltage across it, at which time its resistance drops to a very low value. Diode 36 in the test circuit of FIG. 1 does not conduct to any significant degree unless there is more than a predetermined voltage applied across it by battery 22. This voltage is conveniently chosen as the level below which the battery should be replaced for proper operation of the camera. When the diode does conduct, as indicated in FIG. 2 at $v$ indicating adequate battery voltage, the instrument is deflected full scale by the large current $i$ through the diode.

Figure 3:
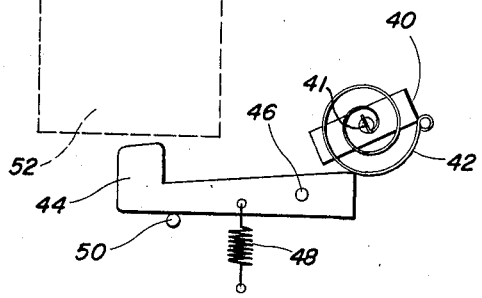
FIGS. 3 and 4 illustrate two positions of a camera viewfinder signal that can be used as an additional element of the invention.
Figure 4:
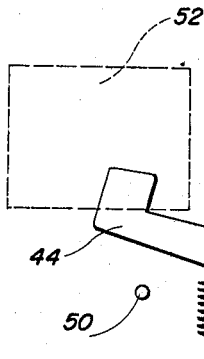

Zero scale and full scale instrument deflection are illustrated in FIGS. 3 and 4, respectively, wherein the instrument coil is shown at 40 and is pivoted at 41. The usual return spring is shown at 42. In these illustrations full scale deflection is counterclockwise from zero scale deflection.

As indicator flag 44 is pivoted at 46 and normally maintained by a spring 48 in its full counterclockwise position against a stop 50, as shown in FIG. 3. When the instrument coil 40 is moved counterclockwise to its full scale position during a battery test, indicating adequate battery voltage, it engages flag 44 and rocks the latter clockwise so that the flag becomes visible in a viewfinder 52 of the camera.

The invention has been described in detail with particular reference to a preferred embodiment thereof, but it will be understood that variations and modifications can be effected within the spirit and scope of the invention as described hereinabove and as defined in the appended claims.

I claim:

1. In a camera having a battery and having a photoelectric exposure control system including an electric measuring instrument with a member deflectable in accordance with energization of said instrument, a battery test circuit comprising, in combination: a Zener diode; and switching means for connecting said diode in series with said battery and said instrument for imparting a large deflection to said member if the output voltage of said battery is above a predetermined level and for imparting substantially no deflection to said member if the output voltage of said battery is below said level.

2. The combination defined in claim 1, wherein said camera includes a motor normally energized by said battery, with: a resistor simulating the resistive impedance of said motor; and switching means for disconnecting said motor from said battery and for connecting said resistor across said battery in parallel with said test circuit.

3. The combination defined in claim 1, with: signal means movable relative to a viewing locus in said camera; means normally maintaining said signal means in a first position; and means controlled by said instrument for moving said signal means to a second position in response to said large deflection of said instrument member.

4. The combination defined in claim 3, wherein said instrument member is deflectable only within a predetermined range during photoelectric exposure control, and wherein said large deflection is beyond said range.

References Cited by the Examiner
FOREIGN PATENTS 1,056,470 4/1959 Germany.
1,235,184 5/1960 France.

NORTON ANSHER, *Primary Examiner.*